May 29, 1962    C. H. KRETSCHMER, JR., ET AL    3,036,919

METHOD OF PROCESSING WHEAT GERM

Filed May 9, 1958

INVENTORS
CHARLES H. KRETSCHMER JR
HENRY J. MARTIN
BY

ATTORNEYS

United States Patent Office 3,036,919
Patented May 29, 1962

3,036,919
METHOD OF PROCESSING WHEAT GERM
Charles H. Kretschmer, Jr., and Henry J. Martin, Saginaw, Mich., assignors to The Kretschmer Wheat Germ Corporation, Carrollton, Mich., a corporation of Michigan
Filed May 9, 1958, Ser. No. 734,266
8 Claims. (Cl. 99—80)

This invention relates to wheat germ and more particularly to a method of processing wheat germ to obtain a product having a pleasing flavor which is relatively stable and will keep for a considerable period of time.

In its natural or raw state wheat germ, which is removed from the wheat kernel during the milling process because it renders flour readily spoilable in its raw state in a relatively short period of time, contains about 10–14% by weight moisture and has rich stores of B complex vitamins, protein, many minerals, and oil of wheat germ which is considered to be one of the best sources of vitamin E. It is well known that the removal of wheat germ from flour and other refined cereal products in order to prolong their keeping qualities or storageability results in a finer, lighter flour product, but in a loss of nutritive values. One ounce of wheat germ, for instance, supplies 49% of the minimum daily adult requirements of thiamine, 1.5% of the minimum daily adult requirements of riboflavin, 22% of the minimum daily adult requirements of iron, 36.5% of the minimum daily adult requirements of phosphorous, one milligram of niacin, and 9.35 gms. of protein. Further, because it has a low sodium content as well as a high nutritive value, wheat germ is frequently prescribed for low sodium diets. Presently, wheat germ is commercially prepared by toasting it and the toasting process by which the wheat germ is provided with a delicious nut-like flavor and an attractive rich golden color must be very carefully controlled in order to avoid a substantial loss of many of the vitamins which raw wheat germ normally carries. The toasting process is necessary to alter the flavor or taste of the product and make it palatable.

One of the most difficult problems that processors of wheat germ have always faced is the fact that the processed product has been quite perishable and in four to six weeks tends to become rancid and develop off odors which affect its taste. This perishability factor is important, of course, since the sale of the product is definitely affected by its storageability during use. Presently, it is customary for the processor to vacuum pack the product in glass jars rather than cardboard cartons as breakfast foods are, for example, and to achieve on the average four to six weeks of shelf life after the jar is opened.

We have discovered that a toasted or cooked wheat germ which has a moisture content of 4 to 8% by weight after processing in the manner to be disclosed as opposed to 10–14% in its natural state and about 1 percent in its customary toasted state, has a greatly increased shelf life. In fact, we have found that wheat germ which is prepared in accordance with the process which will be described and retains moisture within substantially the limits defined will last anywhere from 12 to 14 weeks. Further, we have found that this new and improved wheat germ can be processed in a manner to retain substantially all of its nutritive values. It was one of the prime objects of the instant invention to develop a process of preparing wheat germ which provides a product of high nutritive content and lasts much longer than the product which is presently prepared for commercial consumption.

A further object of the invention is to provide a process of preparing wheat germ which results in an improved flavor and a more palatable appearance of the wheat germ particles or grains which, of course, is an important factor in the sale of the product. The product obtained with present methods is not uniform in color or in size. In a given quantity of the product there are many darker kernels mixed in with the lighter golden kernels, and further there is a considerable quantity of dust or fines formed in present processing interspersed in the product. It is a specific object of the present invention to provide a process of treating wheat germ which provides more edible kernels of relatively uniform size and color. In the instant process, the fines are practically eliminated because in the process of preparation several kernels collect or agglomerate so that each apparent kernel formed is in reality a composite of several kernels and numerous fine particles.

Presently two forms of preparation of wheat germ are practiced so far as applicants are aware. One which readies the product for inclusion in flour for bread consists in toasting the product in an atmosphere which may or may not have a free access of air and provides for the removal of substantially all the moisture so that the end product has 1% to 1¾% moisture or less. The product is first ground, then a moisture absorbent and inert filler are added, and finally the product is thoroughly dried.

The other method, which does not provide a very satisfactory product, is a pressure steaming process which is used by its exponents because they believe that processing in moist steam is necessary to provide a desirable flavor characteristic which processing in dry hot air will not yield. After heating the mixture in a pressure steamer provided with water which will produce steam for more than an hour at a temperature of about 250° F. the product is then dried in hot air at a temperature of about 200° F. This process, however, does not yield a product which is crisp and fresh appearing and many of the valuable vitamins, and particularly the thiamine, are almost entirely removed during the processing operation. The instant invention avoids the disadvantages inherent in these methods and provides a greatly improved product which will be more saleable and will provide purchasers with greater values.

A still further object of the invention is to provide a processing operation which is efficient and reliable, in which the processig of relatively large amounts of the product in a relatively short time is relatively simple and employs inexpensive equipment, and which is no more, or less, expensive than processes presently in use.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

Figure 1:
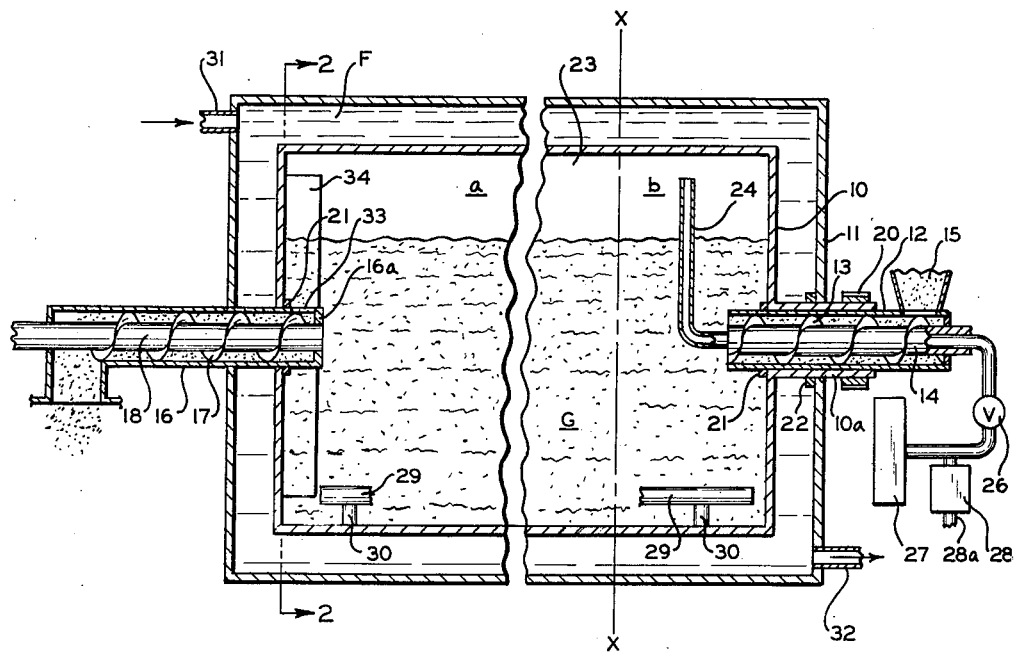
FIGURE 1 is a sectional, elevational view in somewhat schematic form depicting processing apparatus which may be employed to process wheat germ.

Referring now more particularly to the accompanying drawing first of all for a description of the apparatus, a rotary oven or annular drum 10 is shown provided with a peripheral jacket 11 through which a heating fluid F such as hot oil, water, or hot air heated by suitable electrical resistance elements may be circulated. Alternatively, electrical resistance elements insulated from the outside atmosphere can be provided in the wall of the oven or tube type ovens might be employed in which the heat is internally supplied to the bed of wheat germ G within the drum or oven. The oven 10 is of an elongated nature and a screw conveyor casing 12 having flights 13 mounted on a tubular drive shaft 14 is provided to admit the wheat germ product to the oven from a hopper 15. The flights 13 snugly fit the casing 12 so that they, together with the product they convey, constitute an air seal and preclude the admittance of air to the oven except that negligible amount which may come in with the wheat germ. It is to be understood that the vertical hopper 15 completely fills the spaces between the flights of the screw conveyor so that there are no voids. The closely packed particulate product will accordingly carry in no volume of air of consequence. At the opposite end of the oven 10 a similar screw conveyor casing 16 has flights 17 thereon mounted on a driven flight shaft 18 as shown and these flights similarly form an air seal with the product at the discharge end of the oven. The screw conveyor shafts 14 and 18 are preferably driven at the same speed by gears or pulleys having operative connection with a drive motor which furnishes the driving power for the whole system. The drum 10 has a drive sleeve 10a which may be driven by gear 20 operatively connected to the same motor. Provided between the rotary drum 10 and stationary conveyor housings 12 and 16 are seals 21, and a seal 22 is mounted between the stationary jacket 11 and rotary sleeve 10a. It will be noted that the bed G does not fill the entire oven and space 23 is left above the bed. In this space 23 at the front of the oven is a stationary vent tube 24, open at its upper end, which leads out through the tubular screw shaft 14 of the input conveyor. An adjustable valve 26 interposed in the vent tube between the end which is open to atmosphere and the opposite end which is connected to a high velocity suction fan 27 permits the amount of vapor removed out the vent tube to be closely controlled. The valve 26 which is of any conventional design operates to restrict the orifice through which the vapor passes in response to its relative adjustment and provided in the line 24 between the valve 26 and fan 27 is a condensate jar 28 with a line 28a leading to any available drain.

Mounted in the oven 10 at circumferentially spaced intervals are shafts 29 of cylindrical cross section which are fixed a slightly spaced distance inwardly from the interior wall of the oven 10 on lugs 30 welded to the oven wall. These agitator shafts or tumbler bars tend to turn the bed over as the oven revolves so that no wheat germ particles tend to remain directly adjacent the oven wall for more than a very short time. Under these conditions there is no burning of any of the particles and the particles in a particular transverse section of the bed of wheat germ are maintained at a relatively uniform temperature. As the particles in the bed move continuously from right to left their temperature is gradually increased from room temperature to a cooking or toasting temperature of 270–295° F. The continuous tumbling and agitating action of shafts 29 also de-aerates the bed in the sense that any air carried in between the particles of wheat germ is released to the space above the bed almost immediately after entering the oven.

The circulating heating fluid F enters the jacket 11 through an inlet 31 at one end of the oven and leaves through an outlet 32 at the opposite end of the oven. Thus the oven will be warmer at its discharge end than at its charge end. It is desirable that the bed build gradually up to a temperature in the range 270–295° F. which is reached when the bed has traveled about half the length of the oven. It takes a particle of wheat germ approximately an hour to travel from one end of the oven to the other.

At the discharge end of the oven an opening 33 is provided in the top of casing 16 which is fed by blades 34 which revolve with the oven 10. In this way the space between the flights 17 is positively fed so that the product fills the space entirely and forms an air seal, the end of casing 16 being closed by wall 16a.

The wheat germ enters the oven 10 at room temperature which will be about 60–80° F. usually and by the time it reaches the zone line x about one third of the way through the oven which separates zones "a" and "b," it has been raised in temperature considerably and contains no air. The vent tube 24 in zone "a" serves to remove any air from the oven and also a controlled amount of moisture. Any negligible amount of air in the oven which has been brought in between the interstices of the relatively closely packed wheat germ is released in zone "a" by the tumbling or agitating action of shafts 29. The admission of steam from the wheat germ in zone "b" when its temperature reaches 212° F. fills the air space 23 above the wheat germ bed in zone "b" and any such air is forced out the vent tube 24 immediately by the steam. Thus at no time is there any build up of air within the oven beyond the negligible amount entering and by the time zone "b" is reached no air whatever is in the space 23 above the bed. It is in zone "b" when the temperature of the germ is near 200° F. that the presence of air is harmful for we have determined that oxidation and loss of valuable vitamin components occurs near the range 200–295° F. in the presence of oxygen. Further we have found that wheat germ cooked in the presence of air becomes rancid after a relatively short time in use.

In the instant process the wheat germ is literally cooked in its own moisture in the absence of air, since no moisture is used except that which is carried by the wheat germ particles. The negligible amount of air entering with the wheat germ, which mixes with the steam vapor and is immediately removed via the vent tube 24, does not contribute any measurable amount of moisture, and any moisture added from this source is negligible. The effect of our withdrawal of moisture is to cook the product in an amount of steam sufficient only to leave the wheat germ with 4–8% moisture by weight preferably which we have discovered provides long shelf life without leaving the wheat germ with a steamy taste. While wheat germ in a cooked state which is cooked in and left with substantially all of its natural moisture has a long shelf life, its taste is steamy and it will not be nearly as crisp as desirable. By "shelf life" is meant the edible life of the product once the vacuum sealed jar has been opened by the user. If the average product is left with over 5% by weight of its moisture, its shelf life will be increased approximately three times, we have discovered, over the former product which retained about 1% by weight of its moisture. However, while the cooked product is edible with substantially its entire natural moisture intact, it will have an undesirable steamy taste. When the retained moisture is at the 8% by weight level the steamy taste is not apparent and the product is crisp.

When the product is released by the screw 17 to room temperature there is a flash-off of moisture of about ½ percent by weight and this must be considered in adjusting valve 26 so that a controlled amount of moisture is taken off allowing for the flash-off due to the sudden temperature change.

The pressure in the air space 23 above the bed G will be slightly less than atmospheric due to the suction effect of fan 27 and normally the bed will fill about one half of the drum. In FIGURE 1 the oven is rotating in a counterclockwise direction when viewed from its left end and the bed G tends to climb the wall of the drum, of course. The shafts of conveyors 14 and 18 are driven at the same speed and the wheat germ moves continuously from one end of the oven to the other at a relatively slow speed gauged to maintain a bed of particular level which leaves a substantial space in the oven above the bed. When the wheat germ leaves the oven it has been cooked sufficiently to change many of the carbohydrate substances to sugars or simpler, better tasting sugars and has a delicious slightly sweet, nutty flavor and a very attractive golden color. When it is said that the wheat germ is cooked, as distinguished from raw, this hydrolyzing of a substantial quantity of carbohydrates to sugars by raising the wheat germ to high enough temperatures in the oven for a sufficient time to accomplish the flavor change is the change meant. Its moisture content is in the range 4–8% and it retains its valuable stores of vitamins and minerals. The amount of wheat germ oil in the product for instance remains unchanged. The cooking should preferably proceed at atmospheric or substantially atmospheric pressure for 10–15 minutes anyway at a temperature above 212° F. and not greatly over 300° F. For best results the product is, as has been noted, in the drum for an hour at the temperatures previously mentioned.

Figure 3:
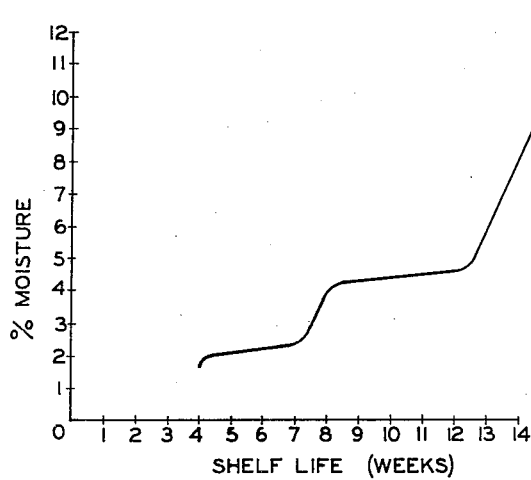
FIGURE 3 is a graph illustrating the effect of moisture level in the cooked wheat germ processed in the manner to be presently described.
Figure 2:
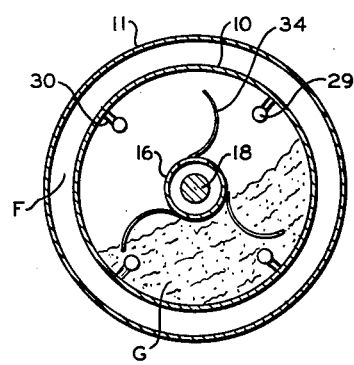
FIGURE 2 is a reduced, sectional, transverse view taken on line 2—2 of FIGURE 1.

As an inspection of the graph in FIGURE 3 will indicate, the shelf life of the product increases rapidly when the retained moisture rises to 4% by weight. Of course, the climate may have some effect on the shelf life of the product. However, even in semi-tropical climates a product which is treated in the manner disclosed and retains over 4% moisture when released to atmosphere exhibits a considerably increased shelf life. If the wheat germ has such a moisture content when released, it means that it carried approximately 4½% prior to the time that it was released to room temperature. The weight of the retained moisture in the wheat germ upon its discharge to room temperature is continually being measured in practice and the amount of steam being taken off by the vent tube 24 is regulated accordingly to leave the desired percentage of moisture by weight in the germ.

Because there is a big mass of product in the germ bed G the particles or grains tend to pack and there is sufficient moisture in the grains themselves so that granules are formed each of which may be made up of several particles. Also in this way the fines or dust is completely eliminated and the resulting product is one with grains which are relatively uniform. Further, no dark spots, as where one grain has been burned or more thoroughly cooked than another are found in the product at the discharge end of the oven. Also by cooking the wheat germ in only its own moisture so to speak or substantially in its own moisture the steamy taste associated with wheat germ which has been pressure cooked is completely avoided when sufficient steam is drawn off to leave the wheat germ with a moisture content of less than 8 percent by weight. If steam were to be added to the drum as from an outside source in addition to the steam generated by heating the wheat germ above 212° F., the product is soggy and the mass tends to jell. By utilizing only the moisture carried by the germ the kernels referred to are formed and when less than 8% moisture by weight is retained in the germ upon its release to room temperature the product is crisp or friable in texture and accordingly much more appetizing.

While for purposes of illustration one form of the invention has been disclosed other forms thereof may become apparent to those skilled in the art upon reference to this disclosure, and therefore this invention is to be limited only by the scope of the appended claims.

In the claims:

1. A process of treating raw wheat germ for use as a food product comprising heating the wheat germ in a substantially sealed atmosphere to a temperature sufficient to boil the moisture in the wheat germ and below the burning temperature of the wheat germ, cooking the wheat germ in the substantial absence of air in its own steam moisture to hydrolyze the carbohydrates contained therein, and withdrawing a predetermined quantity of the moisture from the substantially sealed atmosphere in an amount sufficient to leave the wheat germ with a moisture content of substantially 4 to 8 percent by weight.

2. A process of treating raw wheat germ for use as a food product comprising heating the wheat germ in a substantially sealed atmosphere to a temperature sufficient to boil the moisture in the wheat germ and below the burning temperature of the wheat germ, cooking the wheat germ at substantially atmospheric pressure, in the substantial absence of air and in its own steam moisture to hydrolyze the carbohydrates contained therein, and withdrawing a predetermined quantity of the moisture from the substantially sealed atmosphere in an amount sufficient to leave the wheat germ with a moisture content of substantially 4 to 8 percent by weight.

3. A process of treating raw wheat germ for use as a food product comprising heating the wheat germ in a substantially sealed atmosphere to a temperature sufficient to boil the moisture in the wheat germ and cook the wheat germ, cooking the wheat germ at substantially atmospheric pressure, in the substantial absence of air and in its own steam moisture for about 10 to 15 minutes, and withdrawing moisture from the substantially sealed atmosphere in an amount sufficient to leave the wheat germ with a moisture content of substantially 4 to 8 percent by weight.

4. A process of treating raw wheat germ containing approximately 10–14 percent by weight of natural moisture for use as a food product comprising heating the wheat germ in a substantially sealed atmosphere to a temperature sufficient to boil the moisture in the wheat germ and not greatly over 300° F., cooking the wheat germ, at substantially atmospheric pressure, in the substantial absence of air and in its own steam moisture to hydrolyze the carbohydrates contained therein, and withdrawing moisture from the substantially sealed atmosphere in an amount sufficient to leave the wheat germ with a moisture content of substantially 4 to 8 percent by weight.

5. The process of claim 4 wherein the wheat germ is tumbled while being cooked.

6. A process of treating raw wheat germ containing approximately 10–14 percent by weight of natural moisture for use as a food product comprising heating the wheat germ in a substantially sealed atmosphere to a temperature sufficient to boil the moisture in the wheat germ and cook the wheat germ; cooking the wheat germ at substantially atmospheric pressure, in the substantial absence of air, and in its own steam moisture to hydrolyze the carbohydrates contained therein; and withdrawing moisture from the substantially sealed atmosphere in an amount sufficient to leave the wheat germ with a moisture content of substantially 4 to 8 percent by weight.

7. The process of claim 6 wherein the wheat germ is tumbled while being cooked.

8. A process of treating wheat germ in which the carbohydrates have not substantially been hydrolyzed for use as a food product comprising: heating the wheat germ to a temperature sufficient to boil any moisture in the wheat germ and below the burning temperature of the wheat germ; cooking the wheat germ in the substantial absence of air in a substantially closed steam moisture atmosphere to hydrolyze the carbohydrates contained therein; and adjusting the moisture content of the wheat germ in an amount sufficient to leave the wheat germ with a moisture content of substantially 4% to 8% by weight.

References Cited in the file of this patent

UNITED STATES PATENTS

| | | |
|---|---|---|
| 1,021,119 | Wallis | Mar. 26, 1912 |
| 1,461,703 | Chidlow | July 10, 1923 |
| 2,085,421 | Donk et al. | June 29, 1937 |

FOREIGN PATENTS

| | | |
|---|---|---|
| 332,847 | Great Britain | July 31, 1930 |
| 401,941 | Great Britain | Nov. 23, 1933 |
| 428,620 | Great Britain | May 16, 1935 |